(12) United States Patent
Bone

(10) Patent No.: US 6,693,527 B2
(45) Date of Patent: Feb. 17, 2004

(54) WARNING SYSTEM

(76) Inventor: Julian Lionel Bone, North Lodge, 57 Heathfield Road, Maidstone, Kent, ME14 2AD (GB)

( * ) Notice: Subject to any disclaimer, the term of this patent is extended or adjusted under 35 U.S.C. 154(b) by 41 days.

(21) Appl. No.: 10/149,233

(22) PCT Filed: Dec. 4, 2000

(86) PCT No.: PCT/GB00/04626
§ 371 (c)(1),
(2), (4) Date: Jun. 7, 2002

(87) PCT Pub. No.: WO01/43100
PCT Pub. Date: Jun. 14, 2001

(65) Prior Publication Data
US 2002/0190855 A1 Dec. 19, 2002

(30) Foreign Application Priority Data
Dec. 10, 1999 (GB) .............................. 9929355

(51) Int. Cl.[7] .............................................. G08B 23/00
(52) U.S. Cl. ...................... 340/500; 340/527; 340/517; 340/529; 340/565; 315/307
(58) Field of Search ................................. 340/500, 527, 340/506, 529, 540, 541, 565, 691.1, 517; 315/316, 307, 360, 363

(56) References Cited

U.S. PATENT DOCUMENTS

| | | | |
|---|---|---|---|
| 4,755,792 A | 7/1988 | Pezzolo et al. ............. | 340/538 |
| 5,293,097 A | * 3/1994 | Elwell ......................... | 315/154 |
| 5,329,431 A | * 7/1994 | Taylor et al. .................. | 362/85 |
| 5,650,773 A | 7/1997 | Chiarello ................. | 340/691.8 |
| 5,699,243 A | * 12/1997 | Eckel et al. ................... | 700/17 |
| 5,781,108 A | 7/1998 | Jacob et al. ................. | 340/552 |
| 5,877,683 A | 3/1999 | Sheasley ..................... | 340/506 |
| 6,211,783 B1 | * 4/2001 | Wang .......................... | 340/506 |
| 6,466,826 B1 | * 10/2002 | Nishihira et al. ............. | 700/17 |

FOREIGN PATENT DOCUMENTS

DE    296 14140 U 1    8/1996

* cited by examiner

Primary Examiner—Donnie L. Crosland
(74) Attorney, Agent, or Firm—Duane Morris LLP

(57) ABSTRACT

A warning system (10) arranged in a house (200) having a controller (11) which is designed to operate a first buzzer (17) in response to the activity sensor (20) detecting a person (204) in the vicinity of the house (200) and operate a floodlight (19) and a second buzzer (18) only when the activity sensor (20) activates while a light sensor (20) is in an activated state. The first buzzer (17) operates for the duration of a first pre-set time period, and the floodlight (19), which is delayed from operating for the duration of a second pre-set time period, operates for the duration of a third pre-set time period which is extendible upon further activation of the activity sensor (20). The warning system (10) may be easily configured to operate as an alarm system, or as a warning system which warns a user that the person (204) has been detected in a discrete manner.

34 Claims, 4 Drawing Sheets

WARNING SYSTEM

Figure 1:
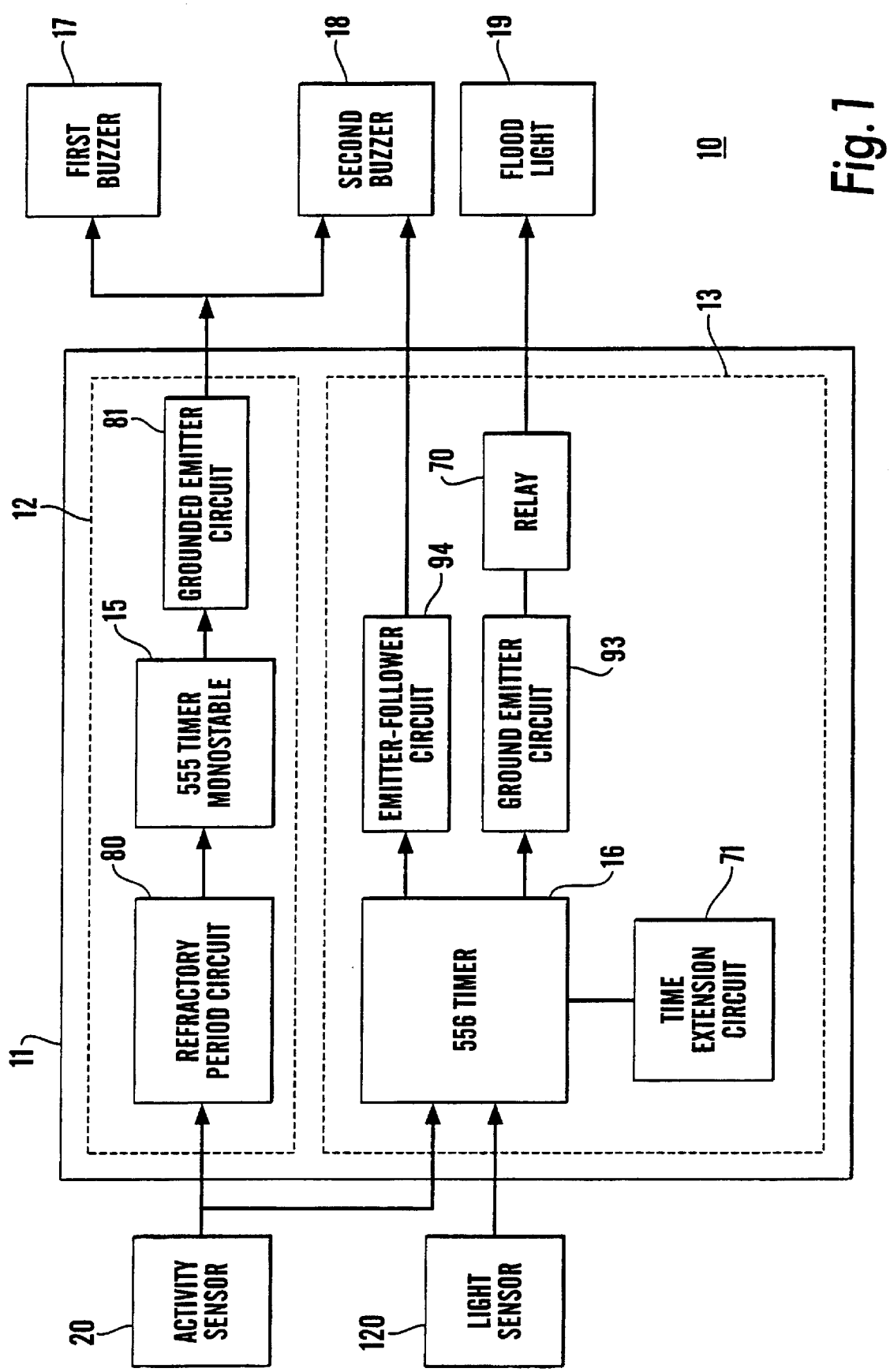

This application claims priority to British Application No. GB 9929355.7 filed Dec. 10, 1999.

The present invention relates to the field of alarm and warning systems and, in particular, to a system which detects activity and controls buzzers, lights, etc.

Common types of burglar alarm systems and other warning devices have a detector, which is activated by the presence of a moving object, and a buzzer or ringer, which is designed to alert the public in response to the detector activating. Often, such systems also have lights which flash on or off and/or move in response to the detector activating. These systems are typically complex and difficult to operate, they are designed to activate warning devices continually or at regular intervals which can cause a nuisance, and the sensors thereof are designed to be in full view, which means a person approaching the system may see the system and avoid detection, or otherwise, deactivate the warning device if it has already been activated. Such systems are, in general, unsuitable for discretely warning others that a person has been detected.

U.S. Pat. No. 4,755,792 discloses a security system for detecting an intrusion and has a controller and slave modules which operate electrical appliances connected thereto. The systems operates the electrical appliances in response to activation of entry detectors after a time delay which allows the system to be disarmed before the appliances are activated.

U.S. Pat. No. 5,650,773 discloses a intrusion warning system in which a control unit is used to operate electrical devices, such as lights, in response to an occurrence detector activating. The period of operation of the electrical devices or the delay in the operation is set by a timer which delays the arming or rearming of the control unit.

There is a need to provide a warning system which is simple and easy to operate, and which, if necessary, can be simply adapted by the user so that it warns the user of the presence of a person in the vicinity of the system in a discreet manner and helps confuse intruders.

According to one aspect, the present invention consists in a warning system including a controller and one or more inputs and one or more outputs, the input(s) comprising one or more activity sensors and the output(s) comprising one or more lights, and in which the controller is adapted to operate the one or more lights after a time delay in response to the activation of the activity sensor or one of the activity sensors and the controller is adapted to extend the period of operation of the light(s) in response to one or more further activations of the activity sensor or one of the activity sensors during operation of the light(s). The delay may be adjusted and is not less than say 5 seconds.

According to another aspect, the present invention consists in a method of operating a warning system having a controller and one or more inputs and one or more outputs, the input(s) comprising one or more activity sensors and the output(s) comprising one or more lights, including the steps of activating the activity sensor or one of the activity sensors when the presence of a moving body is detected, operating the light(s) after a time delay in response thereto, further activating the activity sensor or one of the activity sensors when the presence of a moving body is detected during operation of the light(s), and extending the period of operation of the light(s) in response to the or each further activation of the activity sensor or one of the activity sensors.

Preferably, the warning system includes a light sensor and a first buzzer, and the controller is adapted to operate the first buzzer in response to the activation of the activity sensor and operate the first buzzer and the light in response to the activation of the activity sensor when the light sensor is in an activated state. Preferably, the light is activated after a significant time delay which can be adjusted.

The warning system may include one or more first and second buzzers, light sensors and controllers. The or each controller is adapted to operate the first buzzer(s) in response to the activation of the activity sensor(s), and operate the first and second buzzers and the light(s) in response to the activation of the activity sensor(s) when the or each light sensor is in an activated state.

The warning system may be installed in a house or similar structure. Several sensors may be connected in parallel in order to sense a moving object within the perimeter of a property. Different controllers may be used in order to sound the same or different buzzers and/or switch the same or different lights in response to different activity sensors being activated. Several lights may be connected in parallel including the light in a room of the house in order to give the impression that an occupant of the house has awoken in response to the activity sensor(s) activating. The warning system may also comprise video equipment which the controller activates in response to the activity sensor(s) activating. Mechanical switches may be included in the warning system to enable the light(s) and/or buzzers(s) to be activated manually.

Preferably, when the warning system includes a first buzzer and a light sensor, the method of operating the warning system includes the steps of the controller operating the first buzzer in response to the activation of the activity sensor, the controller operating the first buzzer and the light in response to the activation of the activity sensor when the light sensor is in an activated state. Preferably, the method includes operating the light after a significant time delay which can be adjusted and which is not less than say 5 seconds.

When the warning system includes a second buzzer, the method of operating a warning system includes the steps of the activity sensor activating when the presence of a moving body is detected, the controller operating the first buzzer in response to the sensor activating, and the controller operating the light and the first and second buzzers in response to the activity sensor activating when the light sensor is in the activated state.

Preferably, the controller may be adapted to switch on the first buzzer for a first pre-set time period and may be adapted to delay switching on the light for a second pre-set time period. Furthermore, the controller may be adapted to switch on the light for a third pre-set time period. The light sensor may be in an activated state in darkness and in a deactivated state in daylight, or alternatively, in an activated state in daylight and a deactivated state in darkness. The controller may be adapted so that any of the first, second, third or fourth pre-set time periods are manually adjustable. Typically, the controller may be adapted so that the first buzzer and/or the second buzzer and/or the light can be manually switched to operate independently of the controller. The first buzzer may be an electric doorbell of a house.

According to a feature of the present invention, the controller is adapted to switch on the second buzzer for the first pre-set time period when the first pre-set time period is the same or shorter than the second pre-set time period and is adapted to switch on the second buzzer for the second pre-set time period when the first pre-set time period is the same or longer than the second pre-set time period.

According to another feature of the present invention, the controller is adapted to extend the third pre-set time period in response to the combined activation of the activity sensor and light sensor whilst the light is switched on.

According to yet another feature of the present invention, the controller is adapted to prevent further switching on the first buzzer for a fourth pre-set time period once the controller has switched on the first buzzer.

According to yet another feature of the present invention, the method of operating the present invention may also include any of the following steps: the controller switching on the first buzzer for a first pre-set time period; the controller switching on the light after a second pre-set time period; the controller switching on the light for a third pre-set time period; the controller switching off the second buzzer after the first pre-set time period when the first pre-set time period is the same or shorter than the second pre-set time period and the controller switching off the second buzzer after the second pre-set time period when the first pre-set time period is the same or longer than the second pre-set time period; the controller extending the third pre-set time period each time the activity sensor is activated whilst the light sensor is in the activation state and the light is switched on; the controller preventing the first buzzer from further switching on for a fourth pre-set period once the controller has switched on the first buzzer; the controller disconnecting the buzzer circuitry from the activity sensor(s) for the duration of forth present time period; the controller disconnecting the first buzzer and/or the second buzzer and/or the light from the controller.

Some major advantages of the present invention are that it is simple and easy to use and the delayed action of the light switching on helps conceal the activity sensor and confuse intruders. Extending the time period for which the light remains on if a person is further detected permits simple tasks to be performed at night without having to manually switch the light on. The present invention allows the warning system to be flexible in its installation, configuration and testing; it may not require resetting in the event of a power failure; and it may be easily configured to operate as a conventional alarm system or, as a warning system which discreetly warns the user that a person has been detected. An advantage of a feature of the present invention is that the light and second buzzer are only switched on by the controller in darkness or when ambient light intensity is below a predetermined threshold and not during daylight when they are likely to cause a nuisance. The discreet buzzer may notify the occupant of the house immediately a person enters the house without alerting the person to the fact that they have been detected. The second buzzer can be situated in a bedroom so as to ensure the occupant is alerted at night and/or that other occupants in other rooms are not disturbed.

Figure 2:
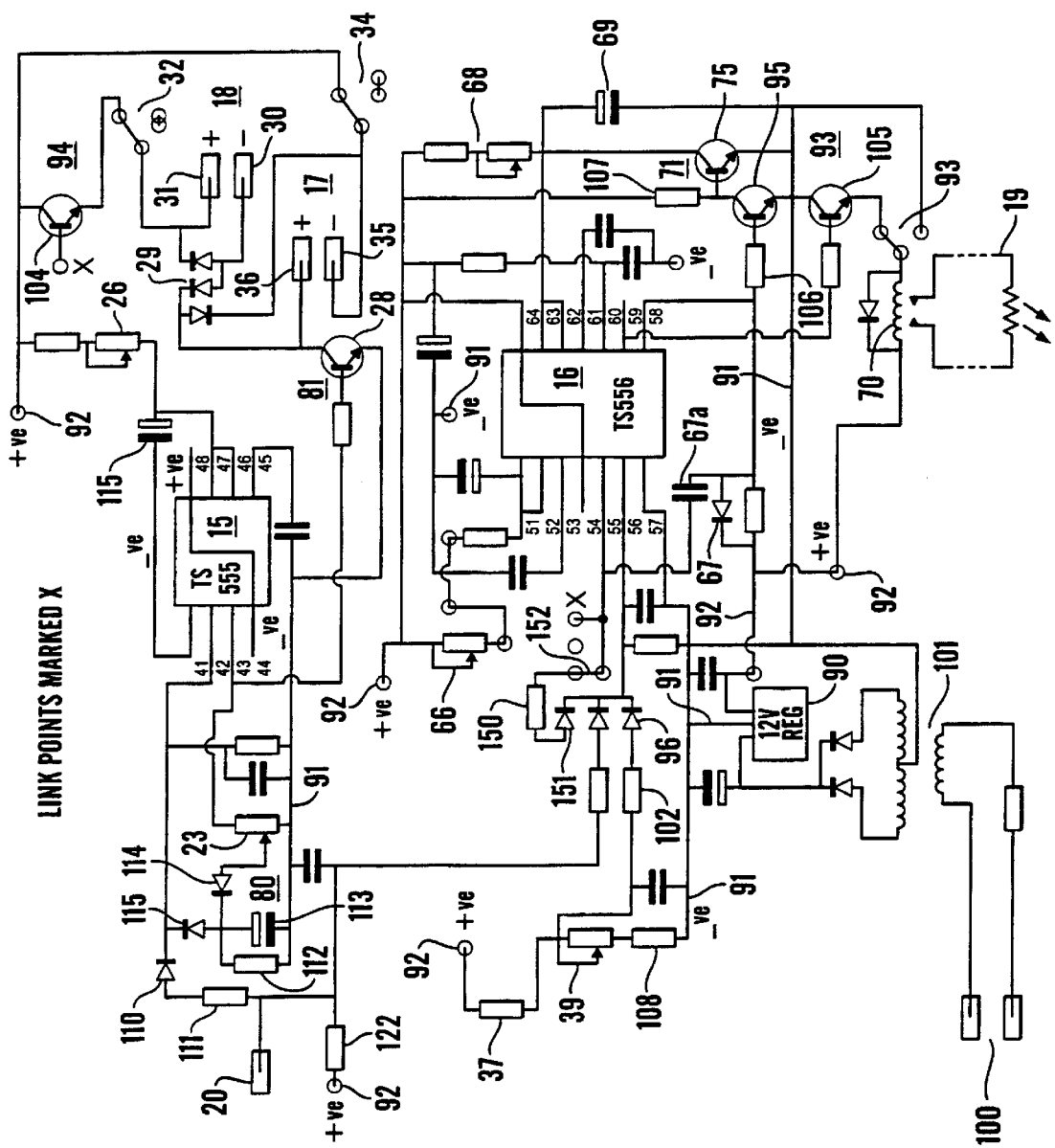
Figure 3:
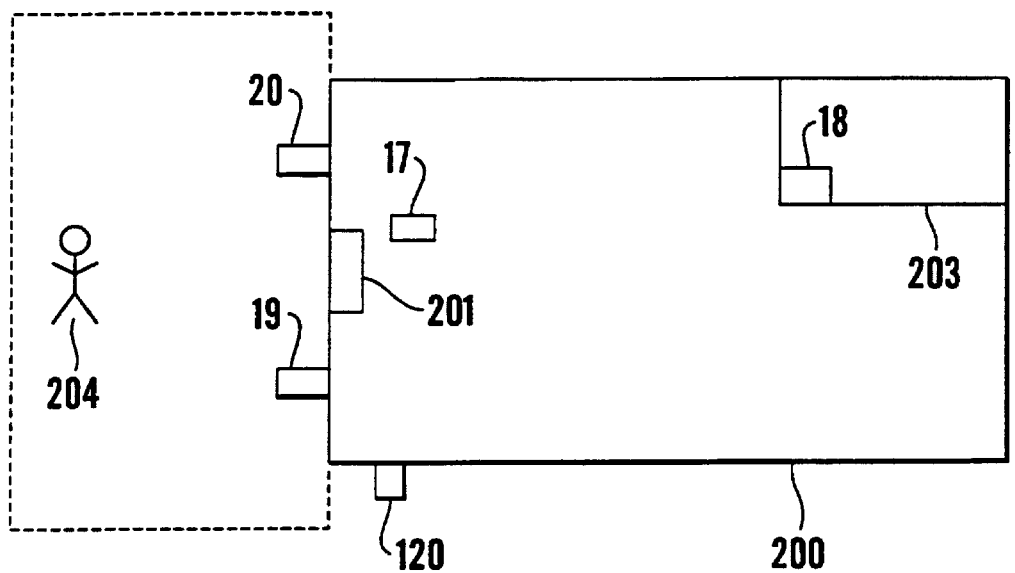
Figure 5:
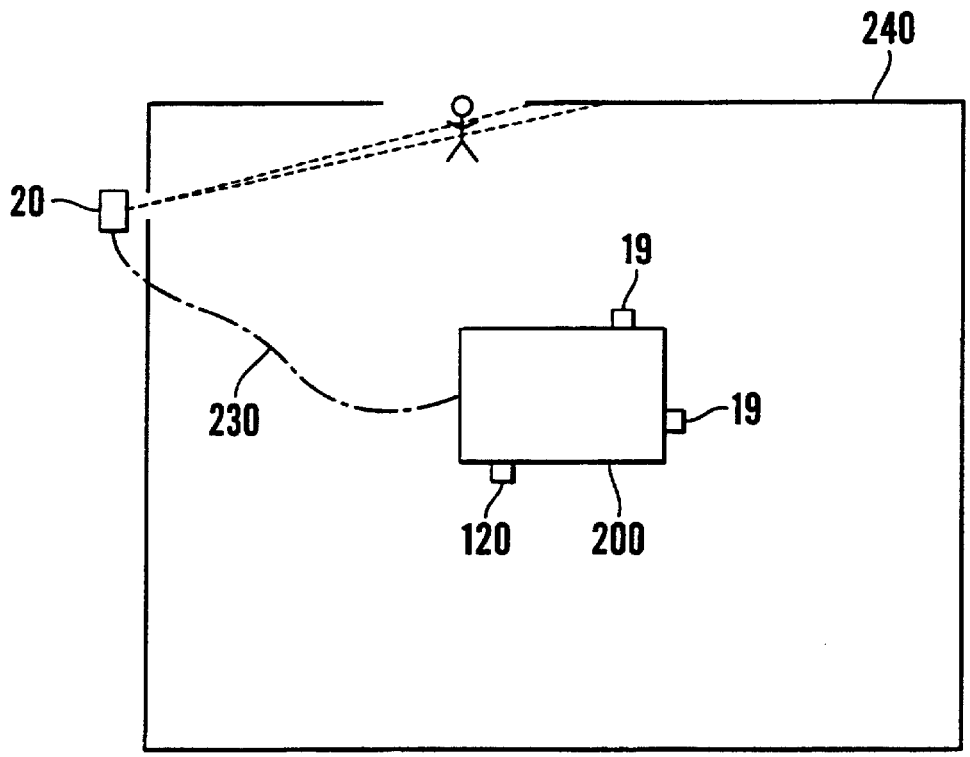
Figure 4:
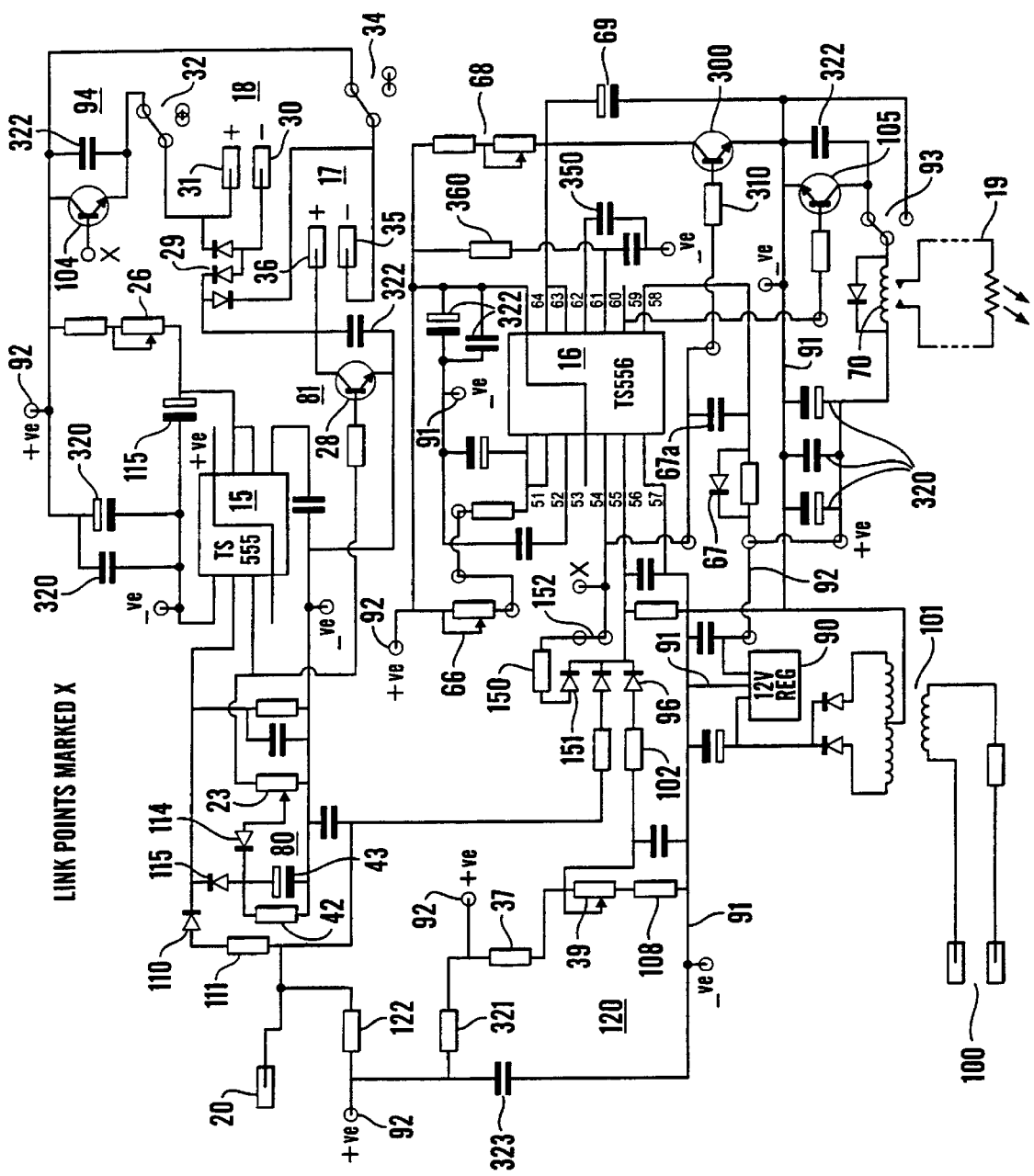

Embodiments of the present invention will now be described by way of example with reference to the accompanying drawings in which;

FIG. 1 is a general block diagram of the warning system according to a first embodiment of the present invention, FIG. 2 is a schematic of the circuitry of the warning system according to the first embodiment of the present invention, FIG. 3 is a plan view of a house showing the location of the activity sensor, the light sensor, the first and second buzzers and the floodlight according to the first embodiment of the present invention, FIG. 4 is a schematic of the circuitry of the warning system according to a second embodiment of the present invention, and FIG. 5 is a plan view of a house showing the location of the pencil beam type activity sensor, the light sensor, and the lights according to another embodiment of the present invention.

Referring to FIGS. 1 and 2 of the accompanying drawings, there is shown a general block diagram of the warning system 10 according to a first embodiment of the present invention. The warning system 10 has two inputs, a controller 11, and three outputs. The two inputs are an activity sensor 20, such as a movement sensor, in particular, an infra red movement sensor or a pressure sensor, and a light sensor 120, and the three outputs are a first buzzer 17, a second buzzer 18 and a floodlight 19. The warning system circuitry is powered by an appropriate power supply, which in this embodiment is a 240 AC mains supply 100 which is stepped down to ±12 V DC by means of a transformer 101 and a 12 V Regulator 90.

As shown in FIG. 1, the controller 11 effectively comprises two sub-controllers 12, 13. The first sub-controller 12 is connected to the activity sensor 20 and the first and second buzzers 17, 18, and the second sub-controller 13 is connected to the light sensor 120, the activity sensor 20, the second buzzer 18 and the flood light 19. The first sub-controller 12 includes a TS 555 integrated circuit 15 and associated circuitry, a refractory period circuit 80, and a first grounded emitter transistor circuit 81. Referring now to FIG. 2, the TS 555 integrated circuit 15 and associated circuitry, also known as a 555 Timer, is configured in a known fashion so as to function as a monostable multivibrator. In this mode, the time period of a first output pulse generated at the output pin 43 of the 555 Timer 15 is adjustable by means of a first variable resistor 26. When the activity sensor is inactive, the first input pin 42 of the 555 Timer is pulled high by means of a resistor 122, which is connected between the resistor 111 and a positive power supply 92, and when the activity sensor activates, it switches this input pin 42 to a low voltage. The input pin 42 of the 555 Timer 15 is connected to the activity sensor 20 via a diode 110 in series with a resistor 111 and this pin together with the output pin 43 are connected to the refractory period circuit 80. The refractory circuit 80 includes a second variable resistor 23 connected between the negative power supply 91 and the output pin 43 of the 555 Timer 15 with its wiper connected to one end of a diode 114. The other end of the diode 114 is connected to the input pin 42 of the 555 Timer 15 via a diode 115 and to the negative power supply 91 via a resistor 112 and via a capacitor 113. When a first output pulse is being generated at the output pin 43 of the 555 Timer in response to the activity sensor 20 activating, the capacitor 113 charges up and causes the voltage at the input pin 42 to rise to a voltage as set by the second variable resistor 23. When the capacitor 113 has charged up sufficiently, the 555 Timer 15 is prevented from generating a further first output pulse in response to a further activation of the activity sensor 20. The resistor-capacitor network of the refractory circuit 80 sets the rate at which the capacitor 113 charges and discharges. When the output of the activity sensor 20 remains at a low voltage, such as when it is rendered inoperable or when the pull up resistor 122 and/or activity sensor are disconnected from the circuit, the 555 Timer functions as either an astable multivibrabtor or a continuously on monotstable. The 555 Timer 15 operates as an astable multivibrator when the second variable resistor 23 is adjusted so that the capacitor 113 charges up the input pin 42 to a voltage higher than the trigger threshold voltage of the 555 Timer 15 during the first output pulse 555 Timer 15. When the output pin 43 falls low at the end of the first output pulse, the capacitor 113 discharges through resistor 112 causing the input pin 42 to fall by a sufficient voltage to retrigger the 555 Timer 15 to produce a further first output pulse. This cycle then repeats itself. In this configuration, the time period between each subsequent first output pulse of the 555 Timer 15 is set by the discharging time of the capacitor 113 and resistor 112. Preferably, the capacitor 113 and resistor 112 are chosen so that the capacitor may rapidly discharge. Alternatively, in the event that the second variable resistor 23 is adjusted so that the capacitor 113 cannot charge above more than a third of the 555 Timer 15 power supply voltage, then the output pin 43 remains continuously high. The second variable resistor 23 can therefore be used to control the 555 Timer 15 so that the output pin 43 is either effectively continuously high or pulses high and low.

The first grounded emitter circuit 81 includes a first transistor 28 which is npn-type with its base connected to the output pin 42 and its collector and emitter connected to the negative input 36 of the first buzzer 17 and the negative power supply 91, respectively. The positive input 35 of the first buzzer 17 is connected to the positive power supply 92 via a first mechanical switch 34. Also, the negative input 36 of the first buzzer 17 is connected to the negative input 30 of the second buzzer 18 via a biased diode 29. The first transistor 81 has a power rating sufficient to drive the first and second buzzers.

The light sensor 120 comprises a light dependent resistor 37 a variable resistor 39 and a fixed resistor 108. One end of the light dependent resistor 37 is connected to the positive supply 92 and the other end is connected to the negative supply 91 via the third variable resistor 39 and a resistor 108. The wiper of the third variable resistor 39 is connected to one end of its track and the first input pin 56 of the 556 Timer 16 via a resistor 102 and a diode 96.

The second sub-controller comprises a TS 556 Integrated Circuit 16 and associated circuitry, a second grounded emitter transistor circuit 93, and an emitter follower circuit 94, a time extension circuit 71 and an activation means, such as a relay 70. The TS 556 Integrated Circuit 16, also known as a 556 Timer, and associated circuitry is configured in a known way to effectively function as two monostable 555 Timers. The second input pin 58 of the 555 Timer is A.C coupled to the first output pin 55 using a capacitor 67a and is also connected to a snubbing diode 67 so as to ensure that the falling edge of a second output pulse generated at the first output pin 55 triggers the 556 Timer so as to generate a third output pulse at the second output pin 59 of the 556 Timer and prevent mistriggering. In this mode, the time period of the second output pulse is adjustable by means of adjusting a fourth variable resistor 66 and the time period of the third output pulse is adjustable by means of adjusting a fifth variable resistor 68. The reset of the 556 Timer 16 is configured so that when the circuit is powered up after a power failure, the second output pin 59 resets to a low voltage, and a further third output pulse will be generated when the 556 Timer 16 is retriggered by the falling edge of a further second output pulse. In this way, the full load of the light is not presented on power restoration after a power failure.

The emitter-follower circuit 94 includes a second transistor 104 which is npn-type with its base fed to the first output pin 55 of the 556 Timer, its collector connected to the positive supply 92 and its emitter connected to the positive input 31 of a second buzzer 18 via a second mechanical switch 32. The second grounded emitter circuit 93 includes a third transistor 105 which is npn-type with its base connected to the second output pin 59 of the 556 Timer 16, its collector connected to one end of the relay 70 via a third mechanical switch 93 and its emitter connected to the negative supply 91. The other end of the relay 70 is connected to the positive supply 92 and the relay contacts are connected to a separate circuit (not shown) used for powering the floodlight 19. The third mechanical switch can be used to switch the input of the relay 70 from the collector of the third npn transistor to open or to negative voltage. Both the second transistor 104 and third transistor 105 have a power rating sufficient to drive the second buzzer 18 and the relay 70, respectively.

The time extension circuit 71 includes fourth and fifth transistors 75, 95, which are npn-type and which are configured as grounded emitters, and resistors 106, 107, so arranged that the capacitor 69 discharges when the second output pulse ends at the second input 58 of the 556 Timer. In this way, if a further second output pulse ends at the second input 58 causing triggering at the second input 58 while a third output pulse is being generated at the second output pin 59, the charging capacitor 69 will discharge rapidly and will recharge again before as set by resistor network 68. This has the effect of extending the time period of the third output pulse by its pre-set time period after the end of the further second output pulse. The output pin 55 of the 556 Timer 16 is fed back to the first input 56 via a resistor 150 and diode 151 so that when the output of the activity sensor 20 remains at a low voltage, such as when it is rendered inoperable or when the pull up resistor 122 and/or activity sensor are disconnected from the circuit, the end of the second output pulse causes a further second output pulse to trigger. In this case, the cycle repeats itself which ensures that third output pulse at the output pin 59 of the 556 Timer 16 is continually extended and the floodlight remains continually activated. Alternatively, the manual switch 152, which is inserted between the resistor 150 and the first output pin 55, may be opened so that the 556 Timer 16 is prevented from being retriggered by the end of the second output pulse so that the floodlights remain off after the third pre-set time period.

The operation of the warning system according the first embodiment shall now be discussed with reference to FIGS. 1, 2 and 3.

In the first embodiment, the warning system is arranged in a house 200 in order to detect the presence of a person 204 in the vicinity of the front entrance 201 of a house 200, as shown in FIG. 3. The activity sensor 20, light sensor 120 and floodlight 19 are positioned outside of the house 200. The light and activity sensors are concealed as much as possible from the person's view. The first buzzer 17 is connected in a useful position, like for example near the front entrance 201 inside the house 200 whilst the second buzzer 18 is concealed in the bedroom 203 of the house 200.

When the person 204 approaches the entrance of the house 200 in daylight, the activity sensor 20 activates and pulls the voltage at the input of the 555 Timer 15 sufficiently low so that a first output pulse is immediately generated at the output pin 43 of the 555 Timer with a first pre-set time period, say, 0.5 seconds. This first output pulse switches on the first transistor 28 and the first buzzer 17 for the duration of the first preset time period of 0.5 seconds. In daylight, the light sensor 120 is in a deactivated state, i.e. the resistance of the light dependent resistor 37 is low relative to the third variable resistor 39 and the resistor 108. The voltage at the anode of the diode 96 is sufficiently high to hold the first input of the 556 Timer at a voltage which is high enough to prevent the 556 Timer from generating a second output pulse when the activity sensor 20 is activated.

Similarly, when the person 204 approaches the entrance of the house 200 in darkness, the activity sensor 20 activates and pulls the voltage at the input of the 555 Timer 15 sufficiently low so that the first output pulse is immediately generated at the output pin 43 of the 555 Timer with the first pre-set time period of 0.5 seconds. However, in darkness the light sensor is in an activated state, i.e. the resistance of the light dependent resistor 37 is high relative to the third variable resistor 39 and the resistor 108. The voltage at the anode of the diode 96, as regulated by the third variable resistor 39, is then sufficiently low so that when the activity sensor 20 activates, it is able to pull the first input pin 56 of the 556 Timer to a voltage which is low enough to trigger the 556 Timer and thereby immediately generate a second output pulse with a second pre-set time period of say, 8 seconds, at the first output pin 55 of the 556 Timer. Thus, when the activity sensor 20 activates during darkness, it triggers the 555 Timer, which immediately generates the first output pulse with a pre-set time period of 0.5 seconds and, at the same time, the activity sensor 20 also triggers the 556 Timer, which immediately generates the second output pulse with a second pre-set time period of 8 seconds. This second output pulse switches on the second transistor 104 which, in combination with the first transistor 28 which has been switched on by the first output pulse, switches on the second buzzer 18. At the end of the first output pulse, i.e. after the first pre-set period of 0.5 seconds, the first transistor 28 switches off which switches off both the first buzzer 17 and the second buzzer 18. Also, at the end of the second output pulse, i.e. after the second pre-set time period of 8 seconds of initial activation of the activity sensor 20, a third output pulse with a third pre-set time period, say, 5 minutes, is generated at the second output pin 59 of 556 Timer 60 which causes the floodlight 19 to switch on for the duration of the third pre-set period of 5 minutes. This is achieved by the third output pulse switching on the third transistor 105 which activates the relay 70 and closes the contacts of the floodlight circuit thereby switching on the floodlight 19. At the end of the third output pulse, i.e. after the third pre-set time period of 5 minutes, the third transistor 105 switches off the floodlight 19 via the relay 70.

In summary, when a person is detected in daylight, only the first buzzer buzzes immediately for 0.5 seconds. However, when the person is detected in darkness both the first and second buzzers buzz for 0.5 seconds and after 8 seconds of initial activation of the activity sensor 20, the floodlight switches on for 5 minutes. The delayed action of the floodlight switching on initially helps conceal the activity sensor 20 as the floodlight 19 will usually come on when the person 204 is in a different position to when the activity sensor 20 was activated. This mode of operation conceals whether the floodlight is operated manually or automatically which serves as a theft deterrent to burglars who may make a reconnaissance visit. The delayed action of the floodlight 19 switching on is independent of first and second buzzers 17, 18 switching on. The activation duration of the first and second buzzers 17, 18 is adjustable by means of manually adjusting the resistance of the first variable resistor 26, the illumination duration of the floodlight 19 is adjustable by means of manually adjusting the resistance of the fifth variable resistor 68 and the delay in switching on the floodlight 19 is adjustable by means of manually adjusting the fourth variable resistor 66. Furthermore the level of darkness at which the light sensor will trigger the 556 Timer so that the second buzzer 18 and the floodlight 19 operate is adjustable by means of manually adjusting the resistance of the third variable resistor 39. In the event of that the cable to the activity sensor 20 or pull up resistor 122 is cut while the light sensor is in an inactivated state, the warning system will first operate as if the activity sensor was activated.

Referring to FIG. 4 of the accompanying drawings, there is shown a schematic of the circuitry of a warning system according to a second embodiment of the present invention. The warning system of the second embodiment is constructed and arranged according to the first embodiment save that the time extension circuit and the 556 Timer 16 reset circuit have been modified and additional decoupling capacitors 320, supressors 322 on the transistors and a current limiting resistor 321 with a decoupling capacitor 320 have been added.

Fourth and fifth transistors 75, 95 and associated resistors 106 and 107 of the first embodiment have been substituted by a further transistor 300 which is npn type and which is configured as a common emitter. A resistor 310 is connected between the base of the further transistor 300 and the first output pin 55 of the TS 556 Timer 16 and the transistor's emitter and collector are connected across the capacitor 69.

As in the first embodiment, the output pin 55 of the 556 Timer 16 is fed back to the first input 56 via the resistor 150 and diode 151 so that when the output of the activity sensor 20 remains at a low voltage, such as when it is rendered inoperable or when the pull up resistor 122 and/or activity sensor are disconnected from the circuit, the end of the second output pulse causes a further second output pulse to trigger.

The further transistor 300 and resistor 310 are so arranged in the circuit that when a second output pulse is generated at the output pin 55 of the 556 Timer, the capacitor 69 is made to discharge through the transistor 300 and so is prevented from charging up until the end of the second output pulse at which point a third output pulse generates and the capacitor 69 begins to charge. Thus, when a further output pulse is generated during the third pre-set time period, this has the effect of resetting the third pre-set time period during the duration of the period of the second output pulse.

The first reset pin 54 of the TS 556 Timer 16 is tied to the second reset pin 60 which is coupled to the negative power supply via a capacitor 350 and to the positive supply via a resistor 360 so that when power is restored to the TS 556 Timer 16 after a power failure, both halves of the 556 are held in a reset state for a short period. This prevents the TS 556 Timer 16 triggering the floodlight 19 immediately after power is restored to the circuit in response to the activity sensor activating. It also prevents the floodlight 19 being activated at all in daylight following restoration of power if a passive activity sensor is used.

The additional decoupling capacitors 320, suppressors 322 on the transistors and, the current limiting resistor 321 used with the light sensor 120, provide component protection and improve circuit reliability.

The operation of the warning system according to the second embodiment shall now be discussed with reference to FIG. 4 of the accompanying drawings. The method of operation of the warning system of the second embodiment is similar to that for the first embodiment save that the time extension circuit and the 556 Timer 16 reset operate in a different manner. Should a further second output pulse be generated at the first output pin 55 of the 556 Timer in response to the activity sensor 20 reactivating during the third pre-set time period, then at the beginning of this further second output pulse, the time extension circuit will cause the 556 Timer to continue generating the third output pulse for the duration of the time period of the further second output pulse and for the full third pre-set time period. Hence, as in the aforementioned example of the operation of the first embodiment, when the activity sensor 20 first activates, it generates a second output pulse with a second pre-set time period of 8 seconds and, at the end of this second output pulse, a third output pulse with a third pre-set time period of 5 minutes is generated at the second output pin 59 of the 556 Timer. This causes the floodlight 19 to switch on for the duration of the third pre-set period of 5 minutes after a delay of 8 seconds. Should a further second output pulse be generated at the first output pin 55 of the 556 Timer in response to the activity sensor 20 reactivating during the third pre-set time period, then at the beginning of this further second output pulse, the time extension circuit will cause the 556 Timer 16 to continue generating the third output pulse for the duration of the period of the further second output pulse and the full duration of the third pre-set time period. The time period of the third output pulse will therefore continue for a further 5 minutes and 8 seconds after the activity sensor is reactivated. If the second pre-set time period is greater than the third pre-set time period and a further second output pulse is generated during the third pre-set time period, the third pre-set time period will be extended for the duration of the second pre-set time period. This arrangement essentially ensures that the floodlight 19 is prevented from switching off and back on again when a person reactivates the activity sensor whilst the floodlight 19 is switched on and allows the third pre-set time period to be extended immediately after a further activation of the activity sensor 20, which will occur irrespective of whether the second preset time period is greater or smaller than the third per-set time period.

In an alternative embodiment of the present invention, the light dependent resistor 37 and the resistor 108 are interchanged in the circuit so that when the light dependent resistor 37 has a high resistance, the voltage at the anode of the diode 96 is sufficiently high to hold the first input pin 56 of the 556 Timer at a voltage which is high enough to prevent the 556 Timer from generating a first output pulse when the activity sensor 20 is activated. Hence, when the person 204 is detected in darkness, only the first buzzer 17 immediately buzzes, whereas when the person 204 is detected in daylight both the first and second buzzers 17, 18 immediately buzz and the floodlight 19 switches on for the third pre-set time period after the second pre-set time period.

In another embodiment of the present invention, the electric doorbell of the house 200 replaces the first buzzer 17. The electric doorbell may be a solenoid operated single shot bell so as to give a more discreet and pleasant sound.

In yet another embodiment of the present invention the activity sensor 20 is a pencil beam type sensor which is concealed in a structure 240, such as a hedge or fence, situated in the vicinity of the house, as shown in FIG. 5, and which is connected to the warning system circuitry by means of an underground cable 230. More than one floodlight 19 may be connected in parallel and positioned around the house. In addition more than one first buzzer may be connected in parallel and more than one second buzzer may be connected in parallel and situated in different positions.

All the electrical components described in these particular embodiments do not require resetting so that in the event of a power failure the warning system is immediately operational once power is restored.

It is not intended that the present invention be restricted to the circuit arrangement and electrical components illustrated and described herein. In particular, it would be obvious to a skilled man in the art that the present invention may be applied using circuits other than 555 and 556 Integrated Circuits and a light activation means other than a relay. It is also recognised that those skilled in the art will be capable of installing the warning system in structures other than houses in order to perform the same functions as those described herein without departing from the scope of the present invention. The references to buzzers should be interpreted as covering other audible and/or visible warning means.

What is claimed is:

1. A warning system includes a controller and one or more inputs and one or more outputs, the input(s) comprising one or more activity sensors and the output(s) comprising one or more lights, and in which the controller is adapted to operate the one or more lights after a time delay in response to the activation of the activity sensor or one of the activity sensors and the controller is adapted to extend the period of operation of the light(s) in response to one or more further activations of the activity sensor or one of the activity sensors during operation of the lights.

2. A warning system as claimed in claim 1, wherein the inputs include one or more light sensors and wherein the controller is adapted to operate the light(s) after the time delay in response to the activation of the or each activity sensor only if the one or more light sensors are in a state resulting from dark ambient conditions.

3. A warning system as claimed in claim 1, wherein the outputs also include a first audible warning device and wherein the controller is adapted to operate the first audible warning device in response to the activation of the or each activity sensor.

4. A warning system as claimed in claim 3, wherein the outputs also include a second audible warning device and wherein the controller is adapted to operate the second audible warning device in response to the activation of the or each activity sensor only if the one or more light sensors are in a state resulting from dark ambient conditions.

5. A warning system as claimed in claim 4, wherein the operation of the first audible warning device is for a first pre-set time period.

6. A warning system as claimed in claim 5, wherein the time delay is equal to a second pre-set time period.

7. A warning system as claimed in claim 6 wherein the controller is adapted to operate the second audible warning device for the duration of the first pre-set time period when the first pre-set time period is the same as or shorter that the second pre-set time period and is adapted to operate the second audible warning device for the duration of the second pre-set time period when the first pre-set time period is the same as or longer than the second pre-set time period.

8. A warning system as claimed in claim 7, wherein the operation of the light(s) is for a third pre-set time period.

9. A warning system as claimed in claim 3, wherein the controller is adapted to prevent further operation of the first audible warning device for a fourth pre-set time period once the controller has operated the first audible warning device.

10. A warning system as claimed in claim 9, wherein the outputs also include a second audible warning device and wherein the controller is adapted to operate the second audible warning device in response to the activation of the or each activity sensor only if the one or more light sensors are in a state resulting from dark ambient conditions, said controller further adapted to also prevent further operation of the second audible warning advice for the forth pre-set time period once the controller has operated the first audible warning device.

11. A warning system as claimed in claim 9, wherein the controller is adapted so that any of the pre-set time periods are manually adjustable.

12. A warning system as claimed in claim 1, wherein the controller is adapted to operate the light(s) continually in response to the or each activity sensor input being held at a high or low voltage whilst operating the light(s).

13. A warning system as claimed in claim 3, wherein the controller is adapted to operate the first audible warning device continually or repeatedly in response to the or each activity sensor input being held at a high or low voltage.

14. A warning system as claimed in claim 2, wherein the light sensor changes between an activated and deactivated state when a change between lit and dark ambient conditions is sensed.

15. A warning system as claimed in claim 1, wherein the outputs include video equipment and the controller is adapted to operate the video equipment in response to the activation of the or each activity sensor.

16. A warning system as claimed in claim 1, wherein the controller is adapted so that any of the one or more outputs can be operated in response to the activation of a manual switch.

17. A warning system as claimed in claim 3, wherein the first audible warning device is the doorbell of a building or other equivalent audible warning device associated with a building entry.

18. A method of operating a warning system having a controller and one or more inputs and one or more outputs, the input(s) comprising one or more activity sensors and the output(s) comprising one or more lights, including the steps of activating the activity sensor or one of the activity sensors when the presence of a moving body is detected, operating the light(s) after a time delay in response thereto, further activating the activity sensor or one of the activity sensors when the presence of a moving body is detected during operation of the light(s), and extending the period of operation of the light(s) in response to the or each further activation of the activity sensor or one of the activity sensors.

19. A method according to claim 18, wherein the inputs include one or more light sensors and including the step of operating the light(s) after the time delay in response to the activation of the or each activity sensor only if the light sensor(s) are in a state resulting from dark ambient conditions.

20. A method according to claim 18, wherein the outputs include a first audible warning device and including the step of operating the first audible warning device in response to the activation of the or each activity sensor.

21. A method according to claim 20, wherein the outputs include a second audible warning device and including the step of operating the second audible warning device in response to the activation of the or each activity sensor only if the light sensor(s) are in a state resulting from dark ambient conditions.

22. A method according to claim 21, wherein step of operating the first audible warning device is for the duration of a first pre-set time period.

23. A method according to claim 22, wherein the time delay is equal to a second pre-set time period.

24. A method according to claim 23, wherein the step of operating the second audible warning device is for the duration of the first pre-set time period when the first pre-set time period is the same as or shorter than the second pre-set time period and the step of operating the second audible warning device is for the duration of the second pre-set time period when the first pre-set time period is the same as or longer than the second pre-set time period.

25. A method according to claim 24, wherein the step of operating the light(s) is for the duration of a third pre-set time period.

26. A method according to claim 20, including the step of preventing the first audible warning device from further operating for the duration of a fourth pre-set period after operating the first audible warning device.

27. A method according to claim 26 wherein the outputs include a second audible warning device and including the step of operating the second audible warning device in response to the activation of the or each activity sensor only if the light sensor(s) are in a state resulting from dark ambient conditions, and further including the step of preventing the second audible warning device from further operating for the duration of the forth pre-set time period after operating the first audible warning device.

28. A method according to claim 27 including the step of manually adjusting any of the pre-set time periods.

29. A method according to claim 18, including the step of operating the light(s) continually in response to the or each activity sensor input being held at a high or low voltage whilst operating the light(s).

30. A method according to claim 20, including the step of operating the first audible warning device continually or repeatedly in response to each activity sensor input being held at a high or low voltage.

31. A method according to claim 19, wherein the light sensor changes between an activated and an inactivated state when a change between lit and dark ambient conditions is sensed.

32. A method according to claim 18, including the step of activating a manual switch to operate any one of the outputs.

33. A method according to claim 20, wherein the first audible warning device is a doorbell or other equivalent audible warning device associated with a building entry.

34. A method according to claim 18, wherein the outputs include video equipment and including the step of operating the video equipment in response to the activation of the activity sensor.

* * * * *